US008099089B2

(12) United States Patent
Sedlacek et al.

(10) Patent No.: US 8,099,089 B2
(45) Date of Patent: Jan. 17, 2012

(54) METHOD, USER EQUIPMENT AND SOFTWARE PRODUCT FOR MEDIA STREAM TRANSFER BETWEEN DEVICES

(75) Inventors: Ivo Sedlacek, Kurim (CZ); Adamu Haruna, Tampere (FI); Miguel Garcia, Helsinki (FI); Arto Leppisaari, Kangasala (FI)

(73) Assignee: Nokia Corporation, Espoo (FI)

( * ) Notice: Subject to any disclaimer, the term of this patent is extended or adjusted under 35 U.S.C. 154(b) by 918 days.

(21) Appl. No.: 12/152,759

(22) Filed: May 13, 2008

(65) Prior Publication Data

US 2009/0286516 A1    Nov. 19, 2009

(51) Int. Cl.
*H04M 3/42* (2006.01)
*H04L 12/16* (2006.01)
*H04Q 11/00* (2006.01)
(52) U.S. Cl. .................. 455/416; 455/260; 455/261
(58) Field of Classification Search .................. 455/416; 370/260–261
See application file for complete search history.

(56) References Cited

U.S. PATENT DOCUMENTS

| 6,029,191 A | 2/2000 | Kurashima | |
|---|---|---|---|
| 2007/0070980 A1 | 3/2007 | Phelps et al. | 370/352 |
| 2008/0089307 A1* | 4/2008 | Tuijn et al. | 370/342 |
| 2009/0017856 A1* | 1/2009 | Albertsson et al. | 455/518 |

FOREIGN PATENT DOCUMENTS

WO    WO 2007/051489    5/2007

OTHER PUBLICATIONS

"SIP: Session Initiation Protocol", J. Rosenberg et al, RFC 3261, Jun. 2002; from the Internet.
"The Session Description Protocol (SDP) Label Attribute" O-Levin et al; RFC-4574, Aug. 2006, from the Internet.
The Session Initiation Protocol (SIP) Refer Method R. Sparks, RFC 3515, Apr. 2003, from the Internet.
"Grouping of Media Lines in Session Description Protocol (SDP)", G. Camarillo et al, RFC 3388, Dec. 2002, from the Internet.
"Session Initiation Protocol (SIP)—Specific Event Notification", A. Roach, RFC 3265, Jun. 2002, from the Internet.
"Session Initiation Protocol (SIP) Extension for Event State Publication", A. Niemi, Ed., Oct. 2004, from the Internat.
Signaling Flows (UNI) v2.0.6 (Jun. 2004); Push-To-Talk Over Cellular (PoC); Signaling Flows—UE to Network Interface (UNI); PoC Release 2.0, from the Internet.
National Board of Patents and Registration of Finland; "International Search Report"; whole document; Jul. 31, 2009.
Sipping Working Group; G. Camarillo et al.; "Refering to Multiple Resources in the Session Initiation Protocol (SIP)"; whole document; Jun. 22, 2006.

(Continued)

*Primary Examiner* — Marisol Figueroa
(74) *Attorney, Agent, or Firm* — Ware, Fressola, Van Der Sluys & Adolphson LLP (57) ABSTRACT

A method, user equipment, and computer program product are disclosed for accepting a plurality of media streams at a first user equipment, and then sending a session initiation protocol refer request to a recipient. The request specifies a second user equipment, and the request also indicates a subset of those media streams which the recipient is requested to offer to the second user equipment. There can be at least two media streams of the same media type, out of which some media stream(s) are to be offered to the second user equipment and the other media stream(s) are not to be offered to the second user equipment.

26 Claims, 5 Drawing Sheets

OTHER PUBLICATIONS

Science Direct, Computer Standards & Interfaces 29; M. Chen et al.; "SSIP: Split a SIP session over multiple devices"; pp. 531-545; 2007.
U.S. Appl. No. 60/987,184, filed Nov. 12, 2007, Mutikainenetal.
"SSIP: Split a SIP Session Over Multiple Devices", Thesis Submitted to the Inst. of Communications Engineering, College of Engineering, National Chung Cheng University by Ceng-Jui Peng, Jun. 2005, English Translation.

"Partial Session Mobility in Context-Aware IP-Based Multimedia Subsystems", Thesus Submitted to University of Twente, the Netherlands by Jasper A. Tuijn, Apr. 17, 2007.
"Session Initiation Protocol (SIP) Session Mobility" draft-shacham-sipping-session-mobility-05; R. Shacham et al; SIPPING; Internet Draft; Nov. 18, 2007.

* cited by examiner

METHOD, USER EQUIPMENT AND SOFTWARE PRODUCT FOR MEDIA STREAM TRANSFER BETWEEN DEVICES

FIELD OF THE INVENTION

The invention relates to wireless telecommunications, and more particularly to sessions with multiple media streams used by participating users.

BACKGROUND OF THE INVENTION

Instant messaging (IM) service provides message exchanging procedures for client terminals. One standardization technique for IM related standards uses the Open Mobile Alliance (OMA). It should be understood that the present invention can be applied to messaging related to converged IP messaging or push-to-talk, and to other functions beyond messaging, such as media streams of continuous media types (including audio and video).

Instant Messaging (IM) refers to the transfer of messages between users in near real-time. Messages transmitted during the communication session can also be stored into a database of a network for later retrieval e.g. in situations in which the recipient is e.g. temporarily unavailable to receive the IM message.

IM conversations are messaging sessions between two or more users. A user can request to store messages of an incoming session or to start recording messages during an active conversation. A stored conversation may contain different amount of messages (from 2 to several hundreds) and each message can have text or multimedia content. This means that the size of the stored conversation may vary quite a lot. Therefore, it might not be appropriate to download the whole conversation, especially if the size is not known prior to the download.

The Session Initiation Protocol is specified by RFC 3261, titled "*SIP: Session Initiation Protocol*" (June 2002), which is incorporated herein by reference in its entirety. This document (RFC 3261) describes Session Initiation Protocol (SIP), an application-layer control (signaling) protocol for creating, modifying, and terminating sessions with one or more participants. These sessions include Internet telephone calls, multimedia distribution, and multimedia conferences. SIP invitations used to create sessions carry session descriptions that allow participants to agree on a set of compatible media types. SIP makes use of elements called proxy servers to help route requests to the user's current location, authenticate and authorize users for services, implement provider call-routing policies, and provide features to users. SIP also provides a registration function that allows users to upload their current locations for use by proxy servers. SIP runs on top of several different transport protocols. SIP can set up sessions between humans identified by e-mail-like identifiers or telephone numbers, but anything addressable by a host name or IP address can also participate in a SIP session. The process of session setup involves the discovery of a user wherever located so that a description of the session can be delivered to the user.

A radiophone-type "push-to-talk" call has been developed for cellular networks, to create a new service, distinct from voice call. This kind of arrangement is generally called a PoC network (push-to-talk over cellular network) which is a network deployed with a PoC server, and the PoC focus is on multiparty sessions with half duplex media exchange. OMA also specifies another release of PoC service, PoC Release 2.0. It contains PoC Box service similar to the IM Conversation history feature. Users can store PoC voice conversations into a PoC Box located in a network or in a terminal. Stored conversations can be retrieved later.

Converged Messaging (CPM) is an Open Mobile Alliance (OMA) work item. OMA CPM is a messaging framework which accommodates different user experiences such as deferred and instant messaging, session-based messaging, and half duplex/full duplex conferencing. It aims at consolidating common functionalities of existing messaging services and new features introduced by the convergence of communications brought by SIP-based technologies. It interacts with other OMA enablers such as Presence and XDM.

OMA Push To Talk over Cellular (PoC) is also an OMA work item. OMA PoC service is a two-way form of communications that allows users to engage in immediate communication with one or more users. PoC service is similar to a "walkie-talkie" application where a user presses a button to talk with an individual user or broadcast to a group of participants. The receiving participants hear the sender's voice either without any action on their part, for example, without having to answer the call or may be notified and has to accept the call before he can hear the sender's voice. Other participants can respond to this message once this initial speech is complete. The communication is half-duplex, that is to say, at most one person can talk at a time and all other participants hear the speech. This contrasts with voice calls, which are full duplex, where more than one person can talk at a time. The PoCv1.0 allows communication using voice only, the PoCv2.0 allows also video and text messaging.

The problem is as follows. The PoCv2.1 and CPMv1.0 enablers support usage of multiple media streams in sessions and usage of multiple User Equipments (UEs) by a single user. When the session is established, the user can accept the session invitation with all, subset or only one of his UEs. Each of the UEs can accept all or subset of the media streams offered in the session invitation. However the user may be after some time unhappy with the negotiated media streams presentation at the UEs and may wish to transfer some of the used media streams to another UE (e.g. video from mobile to TV set).

Session Description Protocol (SDP) is being used by a variety of distributed-over-the-network applications. These applications deal with multiple sessions being described by SDP and serving multiple users or services in the context of a single application instance. See RFC 4574 titled "*The Session Description Protocol (SDP) Label Attribute*" (August 2006) which is incorporated herein by reference in its entirety.

An SDP session description typically contains one or more media lines—they are commonly known as "m" lines. When a session description contains more than one "m" line, SDP does not provide any means to express a particular relationship between two or more of them. When an application receives an SDP session description with more than one "m" line, it is up to the application what to do with them. Grouping of media streams is allowed in SDP, according to RFC 3388 titled "*Grouping of Media Lines in the Session Description Protocol (SDP)*" (December 2002) which is incorporated herein by reference in its entirety.

There is currently no defined mechanism which would allow the user to transfer particular media stream(s) currently used at one of the user's UEs, out of arbitrary media streams of the same or different media type, to another of this user's UEs (where the first UE uses several media streams of the same media type), without requiring additional support in the latter UE beyond that described in RFC 3261.

Suppose that the UE1 was offered 8 media streams out of which the 1st, 2nd, $3^{rd}$, $4^{th}$, $5^{th}$, 7th and 8th media streams were accepted. This scenario can be described as follows. SDP offer fragment (some SDP lines are not listed):

| | |
|---|---|
| m=audio 1000 ... | (1st media stream) |
| a=... | |
| m=video 1002 ... | (2nd media stream) |
| a=... | |
| m=message 20004 ... | (3rd media stream) |
| a=... | |
| m=audio 6000 ... | (4th media stream) |
| a=... | |
| m=video 12346 ... | (5th media stream) |
| a=... | |
| m=whatever1 4455 ... | (6th media stream) |
| a=... | |
| m=whatever2 6677 ... | (7th media stream) |
| a=... | |
| m=whatever 30004 ... | (8th media stream) |
| a=... | |

SDP answer fragment (some SDP lines are not listed):

| | |
|---|---|
| m=audio 8000 ... | (1st media stream) |
| a=... | |
| m=video 8002 ... | (2nd media stream) |
| a=... | |
| m=message 50004 ... | (3rd media stream) |
| a=... | |
| m=audio 5560 ... | (4th media stream) |
| m=video 8890 ... | (5th media stream) |
| m=whatever1 0 ... | (6th media stream) |
| m=whatever2 56677 ... | (7th media stream) |
| a=... | |
| m=message 50004 ... | (8th media stream) |
| a=... | |

The user would like to offer 1st, 2nd and 7th media streams used by UE1 to UE2 and keep at the end only the $3^{rd}$, $4^{th}$, $5^{th}$, and 8th media stream at UE1.

It should be noted that a person of ordinary skill will also be familiar with RFC 3903 titled "*Session Initiation Protocol (SIP) Extension for Event State Publication*" (October 2004), which is incorporated herein by reference in its entirety. That document describes an extension to the Session Initiation Protocol (SIP) for publishing event state used within the SIP Events framework. The first application of this extension is for the publication of presence information. The mechanism described in RFC 3903 can be extended to support publication of any event state for which there exists an appropriate event package. It was not intended to be a general-purpose mechanism for transport of arbitrary data, as there are better-suited mechanisms for this purpose.

A person of ordinary skill will also be familiar with RFC 3265 titled "*Session Initiation Protocol (SIP)-Specific Event Notification*" (June 2002) which is also incorporated herein by reference in its entirety. That document describes an extension to the Session Initiation Protocol (SIP). The purpose of the extension is to provide an extensible framework by which SIP nodes can request notification from remote nodes indicating that certain events have occurred. Concrete uses of the mechanism described in this document may be standardized in the future. The event notification mechanisms defined in RFC 3265 were not intended to be a general-purpose infrastructure for all classes of event subscription and notification.

Additionally, a person of ordinary skill will be familiar with the memo titled "Referring to Multiple Resources in the Session Initiation Protocol (SIP)" dated Jun. 22, 2006 (draft-ietf-sipping-multiple-refer-06), which is incorporated by reference herein in its entirety. That document defines extensions to the SIP REFER method so that the method can be used to refer servers to multiple resources. Those extensions include the use of pointers to Uniform Resource Identifier.

SUMMARY OF THE INVENTION

According to the present invention, UE1 sends a SIP REFER request with referred UE2 unified resource identifier (URI) to the REFER recipient (e.g. conference focus or participating function), which upon SIP REFER request reception invites the referred UE2. The SIP REFER request is extended to indicate the media streams which the REFER recipient is to offer to the referred UE2, and the REFER recipient offers only those indicated media streams. The media streams offered from UE1 to UE2 can be all or a subset of the media streams of the same type available at UE1. For example, if UE1 has three audio and two video streams, then UE1 can transfer either the two video streams to UE2 or the three audio streams to UE2. Additionally, the present invention enables the UE1 to transfer one audio stream and one video stream to UE2, while the remaining two audio and one video stream remain at UE1.

Thus, the present invention includes a method, user equipment, and computer program product for accepting a plurality of media streams at a first user equipment, and then sending a session initiation protocol refer request to a recipient. The request specifies a second user equipment, and the request also indicates a subset of those media streams which the recipient is requested to offer to the second user equipment.

DETAILED DESCRIPTION OF THE INVENTION

Several embodiments of the present invention will now be described, merely to illustrate how the invention may be implemented, and without limiting the scope or coverage of what is described elsewhere in this application.

According to a first embodiment of the present invention, the referred UE2 URI in Refer-To header of the SIP REFER request sent by UE1 is extended with "Content-Type" header and "body" header. The "Content-Type" header contains "application/sdp". The "body" header contains an SDP body with the list of the media streams currently negotiated by UE1 in the same order as negotiated in the session invitation or modification (including the rejected media streams). The media streams in the "body" header have the port set (port is XXX in m=<media> XXXX) as follows: those media streams which are to be offered to UE2 have the port number set to a nonzero value; those media streams which are not used by UE1 or which are not to be offered to UE2 have the port number set to zero.

The SDP body in the "body" header may also include SDP attributes of the media streams with nonzero port numbers e.g. if the SDP attributes to be offered to UE2 would be different than currently used by UE1. For example if the UE1 uses a media stream with SDP attribute a=sendrecv and UE2 should only be offered the media stream with the SDP attribute a=sendonly. Note that the SDP body needs to be properly escaped to be inserted into "body" header.

If the SIP REFER request is generated according to referring to multiple resources in the session initiation protocol, the "uri" attribute of the <entry> element is modified instead of the Refer-To header. Here is an example requesting offering of the 1st, 2nd and 7th currently negotiated media streams to UE2:

```
REFER sip:sessionid@participatingfunction SIP/2.0
...
Refer-To: <sip:alice@atlanta.example.com;gr="GRUU of
the target device"?Content-
Type="application/sdp"&body="m=audio 2
...\r\na=...\r\nm=video 2 ...\r\na=...\r\nm=message 0
...\r\na=...\r\nm=audio 0 ...\r\nm=video 0 ...\r\nm=whatever1
0 ...\r\nm=whatever2 2 ...\r\nm=message 0 ...\r\n">
...
```

Note that the \r\n in Refer-To indicates the encoded CR LF—actual encoding can be different. Also, more SDP lines (e.g. SDP attributes) may be added.

The following second embodiment of the invention is a variation of Embodiment 1, and perhaps more promising according to the existing architecture in protocols. According to Embodiment 2, the SDP body is attached to the REFER request, identified with a Content Identifier. The Refer-To header field of the REFER request contains a URI whose "body" parameter contains the Content Identifier URI of the attached SDP body.

```
REFER sip:sessionid@example.com SIP/2.0
Refer-To:
<sip:charlie@example.com?Content-
Type="application/sdp"&body="cid:cn35t8jf02%40example.
com">
Content-Type: application/sdp
Content-ID:         <cid:cn35t8jf02@example.com>
Content-Disposition:         session
v=0
c= ...
m=audio 1000 ...      (1st media stream)
a=...
m=video 1002 ...      (2nd media stream)
a=...
m=message 0 ...       (3rd media stream)
m=audio 0 ...         (4th media stream)
m=video 0 ...         (5th media stream)
m=whatever1 0         (6th media stream)
m=whatever2 1234      (7th media stream)
a=...
m=message 0 ...       (8th media stream)
```

According to a third embodiment of the invention, the Refer-To URI is extended with a special attribute or header containing the list of the media streams to be offered to UE2 out of those negotiated by UE1. The media stream can be identified by media stream order in the list of the negotiated media streams, "label" attribute of the used media stream as in the Session Description Protocol (SDP) Label Attribute, or "mid" attribute of the used media stream as in the grouping of medial lines in the SDP. For example:

```
REFER sip:sessionid@example.com SIP/2.0
Refer-To: <sip:charlie@example.com?media-streams-to-be-
offered="m1Label,m2Label,m7Label">
```

Alternatively the special attribute or header can be a bitmap stating which media streams out of those currently negotiated by UE1 is to be offered to UE2. If the SIP REFER request is generated according to referring to multiple resources in the session initiation protocol, the "uri" attribute of the <entry> element is modified instead of the Refer-To header. Here is an example requesting offering of the $1^{st}$, $2^{nd}$ and $7^{th}$ currently negotiated media streams to UE2 using bitmap:

```
REFER sip:sessionid@participatingfunction SIP/2.0
...
Refer-To: <sip:alice@atlanta.example.com;media-streams-
to-be-offered="11000010">
```

According to a fourth embodiment of the invention, the Refer-To header is extended with a special attribute containing the list of the media streams to be offered to UE2 out of those negotiated by UE1. The media stream can be identified by media stream order in the list of the negotiated media streams, "label" attribute of the used media stream as in the Session Description Protocol (SDP) Label Attribute, or "mid" attribute of the used media stream as in the grouping of medial lines in the SDP. For example:

```
REFER sip:sessionid@example.com SIP/2.0
Refer-To: <sip:charlie@example.com>;media-streams-to-be-
offered="m1Label,m2Label,m7Label"
```

Alternatively, the special attribute can be a bitmap stating which media streams out of those currently negotiated by UE1 is to be offered to UE2. If the SIP REFER request is generated according to referring to multiple resources in the session initiation protocol, a new attribute/element would be added to the <entry> element instead of the Refer-To header. Here is an example requesting offering of the $1^{st}$, $2^{nd}$ and $7^{th}$ currently negotiated media streams to UE2 using the "mid" values:

```
REFER sip:sessionid@participatingfunction SIP/2.0
...
Refer-To: <cid:cn35t8jf02@example.com>
...
Content-Type: application/resource-lists+xml
Content-Disposition: recipient-list
...
Content-ID: <cn35t8jf02@example.com>
<?xml version="1.0" encoding="UTF-8"?>
<resource-lists xmlns="urn:ietf:params:xml:ns:resource-
lists"
  xmlns:xsi="http://www.w3.org/2001/XMLSchema-
instance">
<list>
  <entry uri='sip:alice@atlanta.example.com;gr="GRUU of
the target device"' media-streams-to-be-
offered="midXYZOf1stMediaStream,midABCOf2ndMedia
Stream,midEDFOf3rdMediaStream"/>
</list>
</resource-lists>
```

According to a fifth embodiment of the invention, PUBLISH is used for the session transfer according to Session Initiation Protocol (SIP) extension for event state publication, and SUBSCRIBE/NOTIFY is used to get information about the status of the transfer according to the rules of SIP-specific event notification. A device wishing to split a session or transfer a session can just send a publication to its serving server. The PUBLISH should contain all the necessary information for the association of the targeted device UE2 to the session. <The target device identity><sessionId><type of association><attributes to be offered> All of the UEs, i.e. UE1 and UE2, can do one time subscription or maintain subscription state to get information of multiple devices sharing a session. When a serving server receives a PUBLISH request, the server creates INVITE to the targeted device UE2 based on information received in the Publish i.e. based on <The target device identity><sessionId><type of association><attributes to be offered>. The serving server manages the sessions for the multiple devices on behalf of the user.

Figure 1:
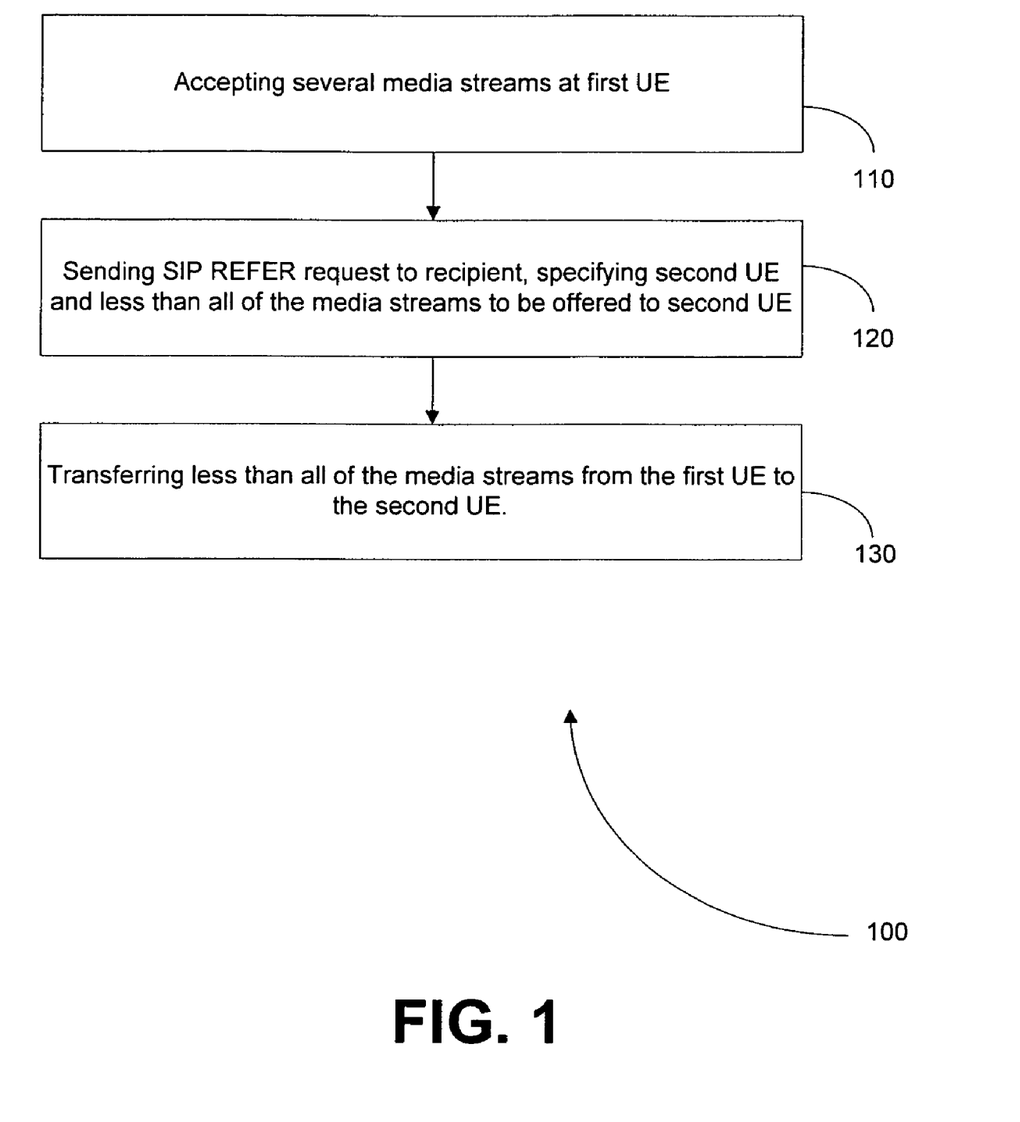
FIG. 1 is a flow chart showing a method according to an embodiment of the present invention.

As seen in FIG. 1, an embodiment 100 of the present invention includes accepting 110 several media streams at a first UE. Then, a SIP REFER request is sent 120 to a recipient, specifying a second UE, and also specifying less than all of the aforementioned media streams that are to be offered to the second UE. And, less than all of the media streams are then transferred 130 from the first UE.

The aforementioned recipient may also be referred to as an "application server." The actual media transfer (relay, distribution) is performed in this embodiment by the recipient, so that the media streams are transferred from the first UE, and to the second UE. The application server has to distribute the media (when the application server is the controlling function) or has to relay the media (when the application server is the participating function). The action of transferring media stream(s) from UE1 to UE2 may proceed as follows: [1] The UE1 asks the application server to transfer media streams X, Y, Z, ... currently used by UE1 to UE2 (SIP REFER request plus SIP 202 Accepted response). [2] The application server invites UE2 to the session and offers media streams X, Y, Z (SIP INVITE request). [3] The UE2 accepts the invitation (SIP 200 OK response for the SIP INVITE request). [4] The application server confirms to UE2 the delivery of the SIP 200 OK response (SIP ACK request). [5] The application server informs UE1 that the UE2 accepted the invitation (SIP NOTIFY request plus SIP 200 OK response). [6] The application server modifies the session with UE1 and removes the media streams which were accepted by UE2 in step 3 (SIP INVITE request plus SIP 200 OK response plus SIP ACK request). The application server can be the controlling function (=focus) or the participating function (=home server serving the user).

Figure 2:
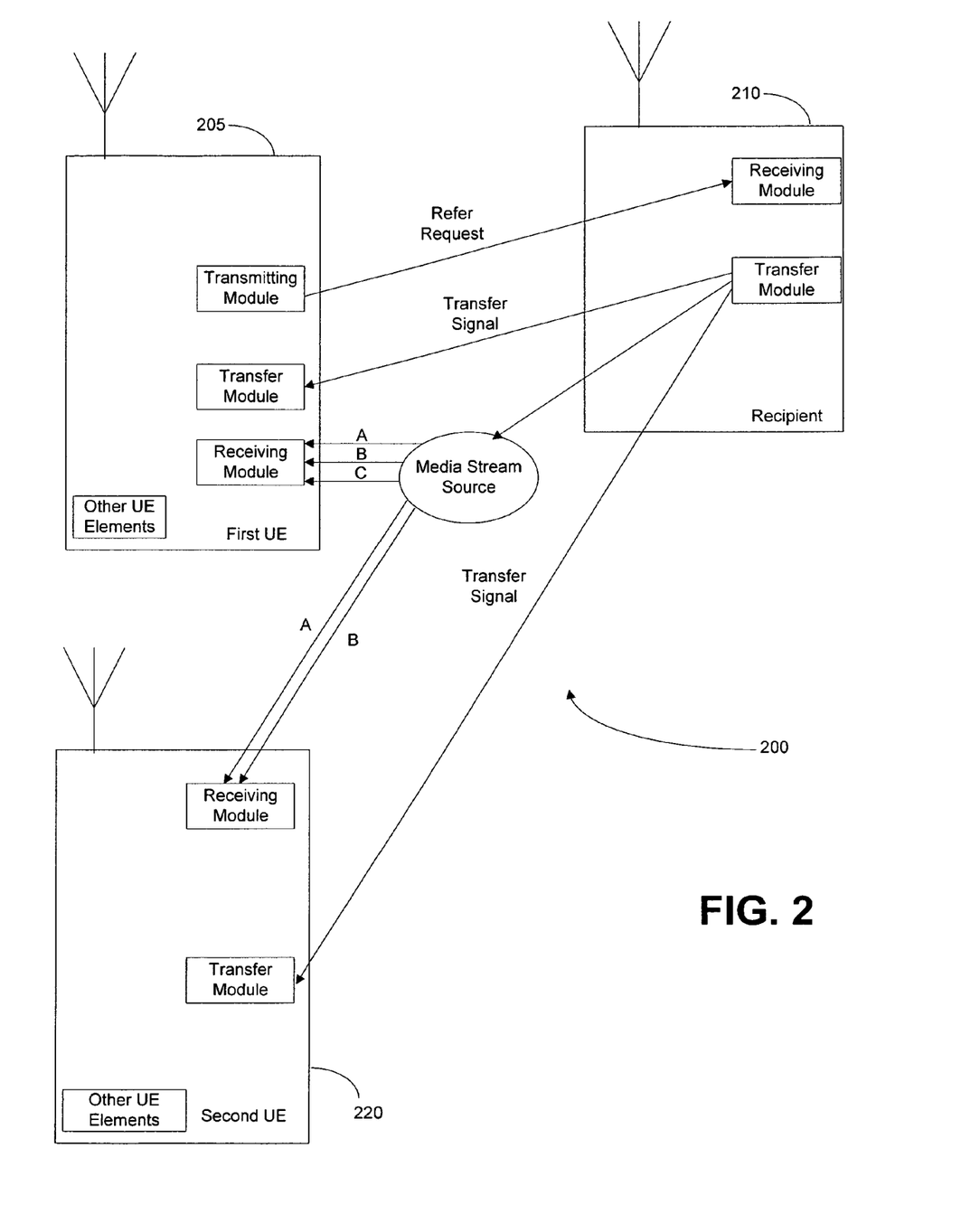
FIG. 2 is a block diagram showing an embodiment of a system according to the present invention.

FIG. 2 is a block diagram outlining a system 200 according to an embodiment of this invention. Although the various components shown in FIG. 2 have antennas, it is to be understood that the present invention is not limited to wireless transmission and media stream transfers; the invention works for both wired and wireless devices, and combinations thereof. A first user equipment 205 receives several media streams A, B, and C from a media stream source. It transmits a refer request to a recipient 210, which in turn provides a transfer signal that causes less than all of those media streams (e.g. stream A and stream B but not stream C) to be transferred to a second UE 220.

Figure 3:
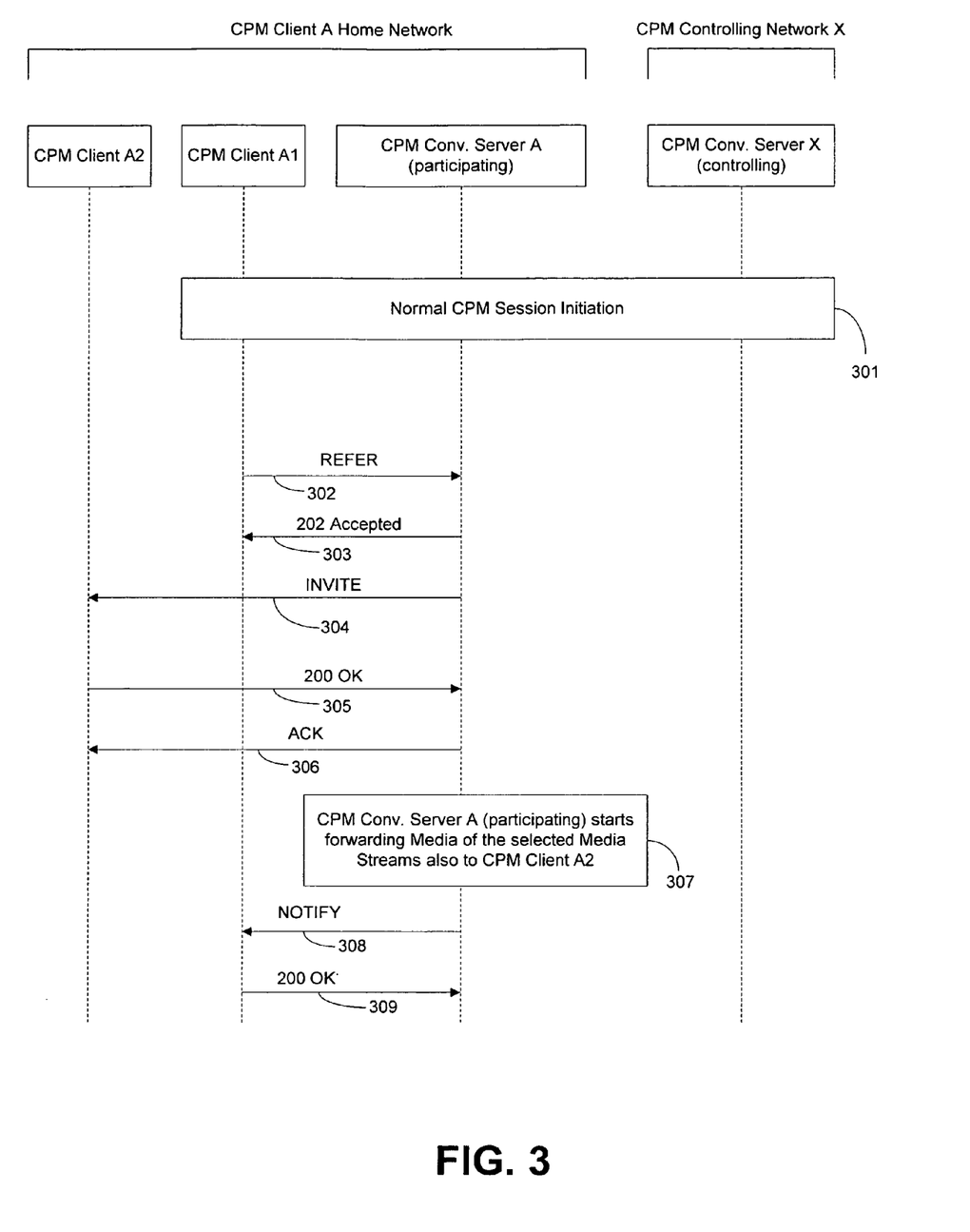
FIG. 3 is a flow chart showing a request to a conversation server that is performing a participating function.

According to FIG. 3, a CPM Client A1 makes a request to the CPM Conversation Server A performing the Participating Function (in short "CPM Conv. Server A (participating)"). According to this request, the CPM Conv. Server A is asked to invite another CPM Client A2 of the same CPM User A to the CPM Session with a subset of the Media Streams currently used by the CPM Client A1.

Step 301 is normal CPM Session initiation. As result of the CPM Session initiation, the CPM Client A1 starts receiving Media of the Media Streams negotiated in the CPM Session. In Step 302, CPM User A (the owner of both the CPM Client A1 and the CPM Client A2) is not happy with reception of the Media at the CPM Client A1 and decides to receive selected Media Streams also at the CPM Client A2. The CPM Client A1 sends SIP REFER request to request the CPM Conv. Server A (participating) to invite the CPM Client A2 to the CPM Session. In addition to the normal signaling the SIP REFER request indicates a subset of the Media Streams to be offered by the CPM Conv. Server A (participating) to the CPM Client A2. Step 303 is normal response to the SIP REFER request. In step 304, CPM Conv. Server A (participating) invites the CPM Client A2 to the CPM Session using a normal SIP INVITE request and offers only the Media Streams indicated in 302. In step 305, CPM Client A2 accepts to participate in the CPM Session using a normal 200 OK response for the SIP INVITE request and accepts all the offered Media Streams. In step 306, reception of the 200 OK response to the SIP INVITE request is acknowledged as normally. In step 307, CPM Conv. Server A (participating) starts sending the selected Media Streams to both the CPM Client A1 and the CPM Client A2. The other Media Streams (those not listed in 2.) are sent only to the CPM Client A1 as previously. Steps 308 and 309 show normal NOTIFY transaction to inform the SIP REFER request sender that the invitation has finished.

Figure 4:
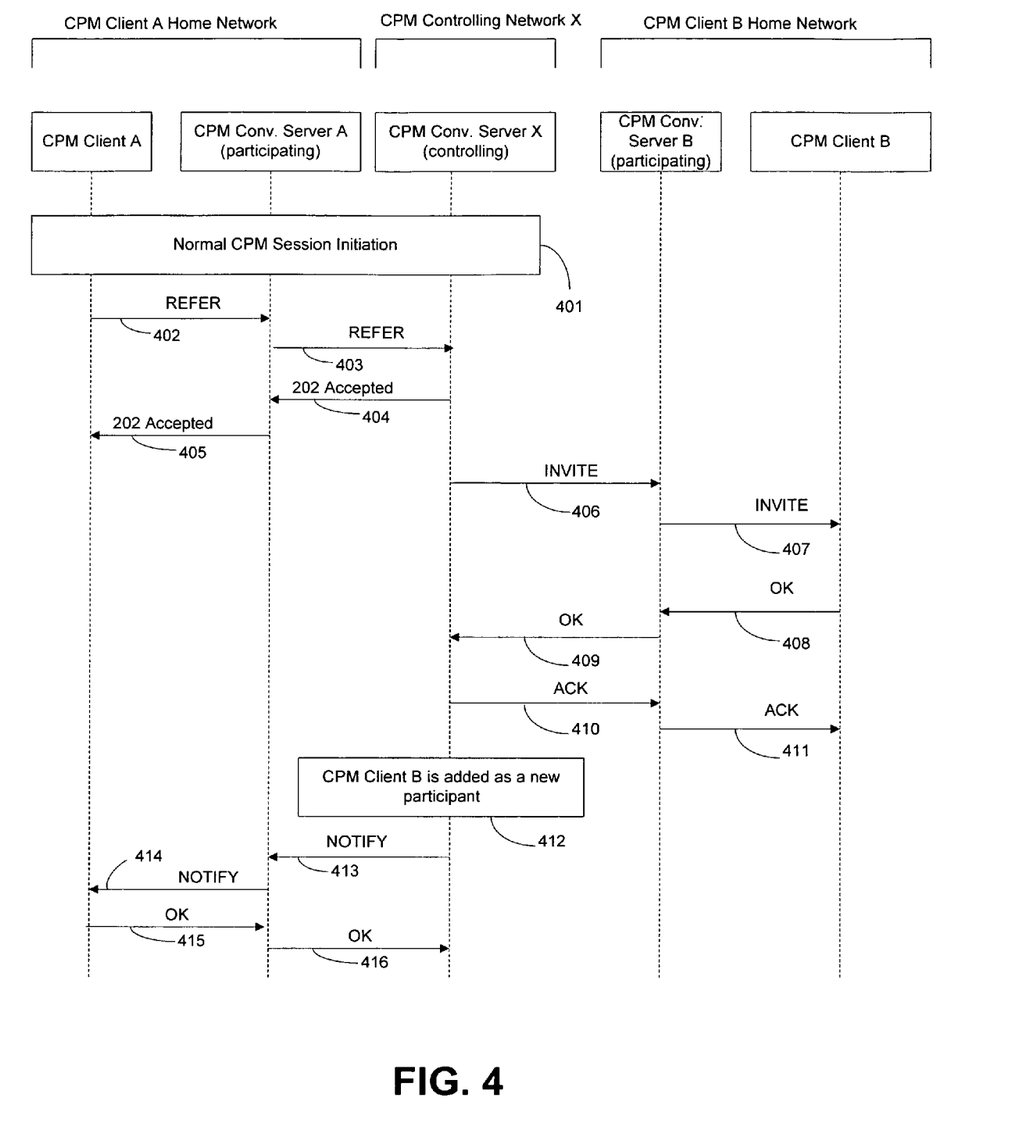
FIG. 4 is a flow chart showing a request to a conversation server that is performing a controlling function.

According to FIG. 4, a CPM Client A makes a request to the CPM Conv. Server X performing the Controlling Function (in short "CPM Conv. Server X (controlling)"). According to this request, the CPM Conv. Server X is asked to invite another CPM Client B to the CPM Session with a subset of the Media Streams currently used by the CPM Client A.

Step 401 shows normal CPM Session initiation. As result of the CPM Session initiation, the CPM Client A starts receiving Media of the Media Streams negotiated in the CPM Session. In steps 402 and 403, CPM User A would like to invite another CPM User B to the CPM Session, but does not want to offer to the CPM User B all the used Media Streams but only a subset. The CPM Client A sends SIP REFER request to request the CPM Conv. Server X (controlling) to invite the CPM Client B to the CPM Session. In addition to the normal signaling the SIP REFER request indicates a subset of the Media Streams to be offered by the CPM Conv. Server X (controlling) to the CPM Client B. Steps 404 and 405 show normal response to the SIP REFER request. In steps 406 and 407, CPM Conv. Server X (controlling) invites the CPM Client B to the CPM Session using a normal SIP INVITE request and offers only the Media Streams indicated in 402-403. In steps 408 and 409, CPM Client B accepts to participate in the CPM Session using a normal 200 OK response for the SIP INVITE request and accepts all the offered Media Streams. Steps 410 and 411 show reception of the 200 OK response to the SIP INVITE request is acknowledged as normally. In step 412, CPM Conv. Server X (controlling) adds the CPM Client B as a new Participant and starts sending to the CPM Client B the negotiated Media Streams. Steps 413 to 416 show normal NOTIFY transaction to inform the SIP REFER request sender that the invitation has finished.

Figure 5A:
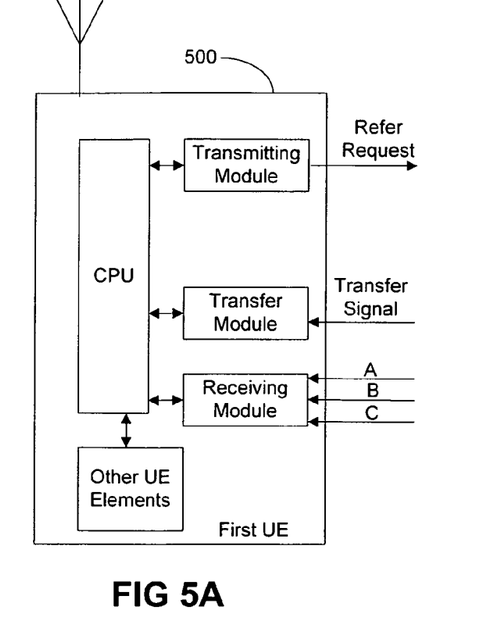
FIGS. 5A, 5B, and 5C are block diagrams separately showing the components of the system of FIG. 2.
Figure 5B:
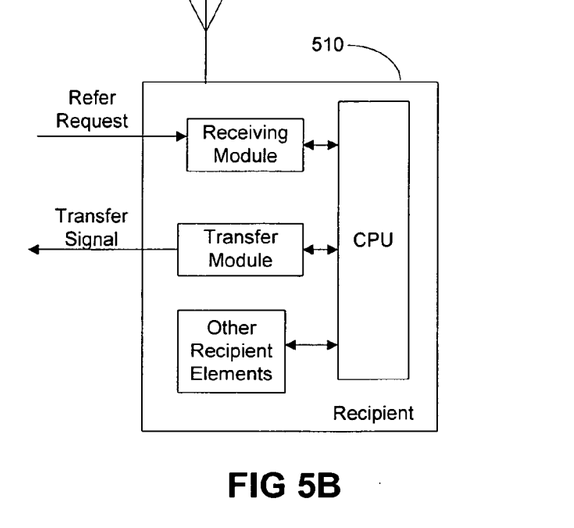
Figure 5C:
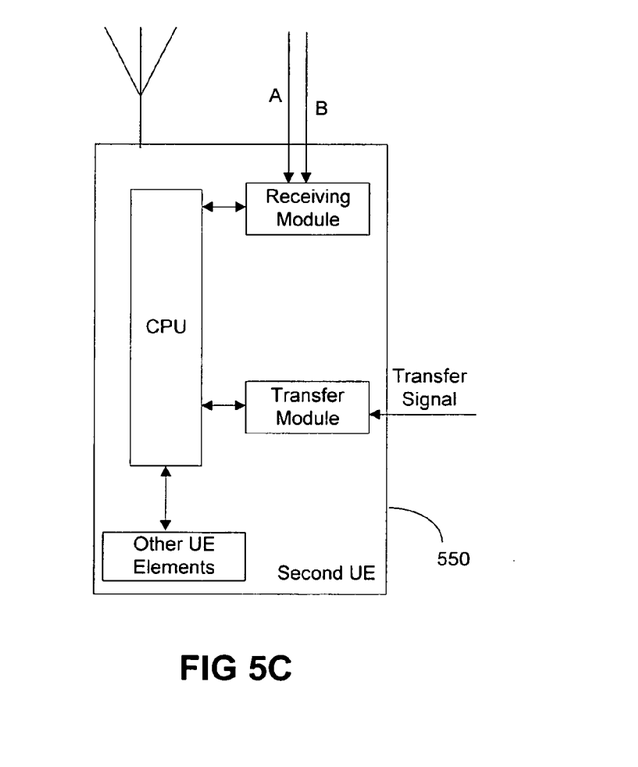

FIG. 5A shows the first user equipment 500, corresponding to element 205 of the system 200 that was shown in FIG. 2. FIG. 5B shows the recipient 510, corresponding to element 210 of the system 200 that was shown in FIG. 2. FIG. 5C shows the second user equipment 520, corresponding to element 220 of the system 200 that was shown in FIG. 2. A person of ordinary skill will understand that the signals entering or leaving each of the apparatuses shown in these figures will do so via an antenna if the apparatus is a wireless communication device, and otherwise will enter or leave via wireline (i.e. copper, fiber optic, or other type of wireline).

The media streams transferred from UE1 to UE2 can be all or a subset of the media streams of substantially the same type available at UE1. For example, if UE1 has three audio and two video streams, then UE1 can transfer either the two video streams to UE2 or the three audio streams to UE2. The present invention also enables the UE to transfer one audio stream and one video stream to UE2.

The present invention includes a first aspect that is a method comprising: accepting a plurality of media streams at a first user equipment; sending a session initiation protocol refer request to a recipient, said request specifying at least a second user equipment, wherein said request also indicates at least one but less than all of said media streams which the recipient is requested to offer to the second user equipment. The first user equipment uses at least two media streams of the same media type, out of which one media stream is to be offered to the second user equipment and the other media stream is not to be offered to the second user equipment.

The present invention includes a second aspect that is the first aspect further comprising: transferring said at least one but less than all of said media streams from said first user equipment to said second user equipment.

The present invention includes a third aspect that is the first aspect wherein said at least one but less than all of said media streams have a common type. There can be at least two media streams of the same media type, out of which some media stream(s) are to be offered to the second user equipment and the other media stream(s) are not to be offered to the second user equipment.

The present invention includes a fourth aspect that is a method comprising: receiving a session initiation protocol refer request from a first user equipment which has already accepted a plurality of media streams, said request specifying at least a second user equipment, wherein said request also indicates at least one but less than all of said media streams which are to be offered to the second user equipment; and, transferring said at least one but less than all of said media streams from said first user equipment to said second user equipment.

The present invention includes a fifth aspect that is the fourth aspect wherein said method is performed by a conference focus or participating function.

The present invention includes a sixth aspect that is a computer program product comprising a computer readable medium having executable code stored therein; the code, when executed by a processor, adapted for: accepting a plurality of media streams at a first user equipment; sending a session initiation protocol refer request to a recipient, said request specifying at least a second user equipment, wherein said request also indicates at least one but less than all of said media streams which the recipient is requested to offer to the second user equipment.

The present invention includes a seventh aspect that is the sixth aspect wherein the code is also adapted for transferring said at least one but less than all of said media streams from said first user equipment to said second user equipment.

The present invention includes a eighth aspect that is a computer program product comprising a computer readable medium having executable code stored therein; the code, when executed by a processor, adapted for: receiving a session initiation protocol refer request from a first user equipment which has already accepted a plurality of media streams, said request specifying at least a second user equipment, wherein said request also indicates at least one but less than all of said media streams which are to be offered to the second user equipment; and, transferring said at least one but less than all of said media streams from said first user equipment to said second user equipment.

The present invention includes an ninth aspect that is the eighth aspect wherein said computer program product is adapted for use by a conference focus or participating function.

The present invention includes a tenth aspect that is an apparatus comprising: means for accepting a plurality of media streams at the apparatus; and means for sending a session initiation protocol refer request to a recipient, said request specifying at least a second user equipment, wherein said request also indicates at least one but less than all of said media streams which the recipient is requested to offer to the second apparatus.

The present invention includes a eleventh aspect that is the tenth aspect further comprising: means for transferring said at least one but less than all of said media streams from said apparatus, in response to a transfer signal from said recipient.

The present invention includes an twelfth aspect that is an apparatus comprising: means for receiving a session initiation protocol refer request from a first user equipment which has already accepted a plurality of media streams, said request specifying at least a second user equipment, wherein said request also indicates at least one but less than all of said media streams which are to be offered to the second user equipment; and, means for transferring said at least one but less than all of said media streams from said first user equipment to said second user equipment.

The present invention includes a thirteenth aspect that is the twelfth aspect wherein said apparatus is a conference focus or participating function.

The present invention includes a fourteenth aspect that is an apparatus comprising: receiving module configured to accept a plurality of media streams at the apparatus; and transmitting module configured to send a session initiation protocol refer request to a recipient, said request specifying at least a second user equipment, wherein said request also indicates at least one but less than all of said media streams which the recipient is requested to offer to the second apparatus.

The present invention includes a fifteenth aspect that is the fourteenth aspect further comprising: a transfer module configured to transfer said at least one but less than all of said media streams from said apparatus, in response to a transfer signal from said recipient.

The present invention includes a sixteenth aspect that is an apparatus comprising: receiving module configured to receive a session initiation protocol refer request from a first user equipment which has already accepted a plurality of media streams, said request specifying at least a second user equipment, wherein said request also indicates at least one but less than all of said media streams which are to be offered to the second user equipment; and, a transfer module configured to transfer said at least one but less than all of said media streams from said first user equipment to said second user equipment.

The present invention includes a seventeenth aspect that is the sixteenth aspect wherein said apparatus is a conference focus or participating function.

The embodiments described above can be implemented using a general purpose or specific-use computer system, with standard operating system software conforming to the method described herein. The software is designed to drive the operation of the particular hardware of the system, and will be compatible with other system components and I/O controllers. The computer system of this embodiment includes the CPU processor shown, comprising a single processing unit, multiple processing units capable of parallel operation, or the CPU can be distributed across one or more processing units in one or more locations, e.g., on a client and server. Memory may comprise any known type of data storage and/or transmission media, including magnetic media, optical media, random access memory (RAM), read-only memory (ROM), a data cache, a data object, etc. Moreover, similar to CPU, memory may reside at a single physical location, comprising one or more types of data storage, or be distributed across a plurality of physical systems in various forms.

It is to be understood that the present figures, and the accompanying narrative discussions of best mode embodiments, do not purport to be completely rigorous treatments of the method, network element, user equipment, and software product under consideration. A person skilled in the art will understand that the steps and signals of the present application represent general cause-and-effect relationships that do not exclude intermediate interactions of various types, and will further understand that the various steps and structures described in this application can be implemented by a variety of different sequences and configurations, using various different combinations of hardware and software which need not be further detailed herein.

What is claimed is:

1. A method comprising:
   accepting a plurality of media streams at a first user equipment, wherein the plurality of media streams comprises a plurality of media streams of a first type;
   sending a session initiation protocol refer request to a recipient, said request specifying at least a second user equipment,
   wherein said request also indicates at least one but less than all of said plurality of media streams of said first type which the recipient is requested to offer to a second user equipment.

2. The method of claim 1, further comprising: receiving information that at least one but less than all of said plurality of media streams of said first type from said first user equipment will be transferred to said second user equipment.

3. The method of claim 1, wherein said plurality of media streams further comprises at least one media stream of a second type.

4. A method comprising:
   receiving a session initiation protocol refer request from a first user equipment which has already accepted a plurality of media streams, wherein the plurality of media streams comprises a plurality of media streams of a first type, said request specifying at least a second user equipment, wherein said request also indicates at least one but less than all of said plurality of media streams of said first type which are to be offered to the second user equipment; and,
   transferring said at least one but less than all of said plurality of media streams of said first type from said first user equipment to said second user equipment.

5. The method of claim 4, wherein said method is performed by a conference focus or participating function.

6. The method of claim 4, wherein said plurality of media streams further comprises at least one media stream of a second type.

7. A computer program product comprising a non-transitory computer readable medium having executable code stored therein; the code, when executed by a processor, configured for:
   accepting a plurality of media streams at a first user equipment, wherein the plurality of media streams comprises a plurality of media streams of a first type;
   sending a session initiation protocol refer request to a recipient, said request specifying at least a second user equipment,
   wherein said request also indicates at least one but less than all of said plurality of media streams of said first type which the recipient is requested to offer to the second user equipment.

8. The computer program product of claim 7, wherein the code is also configured for receiving information that said at least one but less than all of said plurality of media streams of said first type will be transferred from said first user equipment to said second user equipment.

9. The computer program product of claim 7, wherein said plurality of media streams further comprises at least one media stream of a second type.

10. A computer program product comprising a non-transitory computer readable medium having executable code stored therein; the code, when executed by a processor, configured for:
    receiving a session initiation protocol refer request from a first user equipment which has already accepted a plurality of media streams, wherein the plurality of media streams comprises a plurality of media streams of a first type, said request specifying at least a second user equipment, wherein said request also indicates at least one but less than all of said plurality of media streams of said first type which are to be offered to the second user equipment; and,
    transferring said at least one but less than all of said plurality of media streams of said first type from said first user equipment to said second user equipment.

11. The computer program product of claim 10, wherein said computer program product is configured for use by a conference focus or participating function.

12. An apparatus comprising:
    means for accepting a plurality of media streams at the apparatus, wherein the plurality of media streams comprises a plurality of media streams of a first type; and
    means for sending a session initiation protocol refer request to a recipient, said request specifying at least a second apparatus,
    wherein said request also indicates at least one but less than all of said plurality of media streams of said first type which the recipient is requested to offer to the second apparatus.

13. The apparatus of claim 12, further comprising: means for receiving a transfer signal indicative that at least one but less than all of said plurality of media streams of said first type will be transferred from said apparatus.

14. The apparatus of claim 12, wherein said plurality of media streams further comprises at least one media stream of a second type.

15. An apparatus comprising:
    means for receiving a session initiation protocol refer request from a first apparatus which has already accepted a plurality of media streams, wherein the plurality of media streams comprises a plurality of media streams of a first type, said request specifying at least a second apparatus, wherein said request also indicates at least one but less than all of said plurality of media streams of said first type which are to be offered to the second apparatus; and, means for transferring said at least one but less than all of said plurality of media streams of said first type from said first apparatus to said second apparatus.

16. The apparatus of claim 15, wherein said plurality of media streams further comprises at least one media stream of a second type.

17. The apparatus of claim 15, wherein said apparatus is a conference focus or participating function.

18. An apparatus comprising:
a hardware processing unit;
a receiving module configured to accept a plurality of media streams at the apparatus, wherein the plurality of media streams comprises a plurality of media streams of a first type; and
a transmitting module configured to send a session initiation protocol refer request to a recipient, said request specifying at least a second apparatus,
wherein said request also indicates at least one but less than all of said plurality of media streams of said first type which the recipient is requested to offer to the second apparatus.

19. The apparatus of claim 18, further comprising: a transfer module configured to receive a transfer signal indicative that at least one but less than all of said plurality of media streams of said first type will be transferred from said apparatus.

20. The apparatus of claim 18, wherein said plurality of media streams further comprises at least one media stream of a second type.

21. An apparatus comprising:
a hardware processing unit;
a receiving module configured to receive a session initiation protocol refer request from a first apparatus which has already accepted a plurality of media streams, wherein the plurality of media streams comprises a plurality of media streams of a first type, said request specifying at least a second apparatus, wherein said request also indicates at least one but less than all of said plurality of media streams of said first type which are to be offered to the second apparatus; and,
a transfer module configured to transfer said at least one but less than all of said plurality of media streams of said first type from said first apparatus to said second apparatus.

22. The apparatus of claim 21, wherein said apparatus is a conference focus or participating function.

23. An apparatus comprising:
means for receiving a transfer signal for transferring at least one but less than all of a plurality of media streams to said apparatus of a first type; and
means for accepting the at least one but less than all of said plurality of media streams of said first type,
wherein said plurality of media streams of said first type are received by an other apparatus prior to said transferring of at least one but less than all of the plurality of media streams of said first type, and
wherein the transfer signal is from a recipient of a refer request from said other apparatus.

24. The apparatus of claim 23, wherein said plurality of media streams further comprises at least one media stream of a second type.

25. An apparatus comprising:
a hardware processing unit;
a transfer module configured to receive a transfer signal to transfer at least one but less than all of a plurality of media streams of a first type to said apparatus; and
a receiving module configured to receive the at least one but less than all of said plurality of media streams of said first type,
wherein said plurality of media streams of said first type are received by an other apparatus prior to said transferring of at least one but less than all of the plurality of media streams of said first type, and
wherein the transfer signal is from a recipient of a refer request from said other apparatus.

26. The apparatus of claim 25, wherein said plurality of media streams further comprises at least one media stream of a second type.

* * * * *